(No Model.)  
4 Sheets—Sheet 2.
G. F. GREEN.
AUTOMATIC BINDER.
No. 265,060. Patented Sept. 26, 1882.
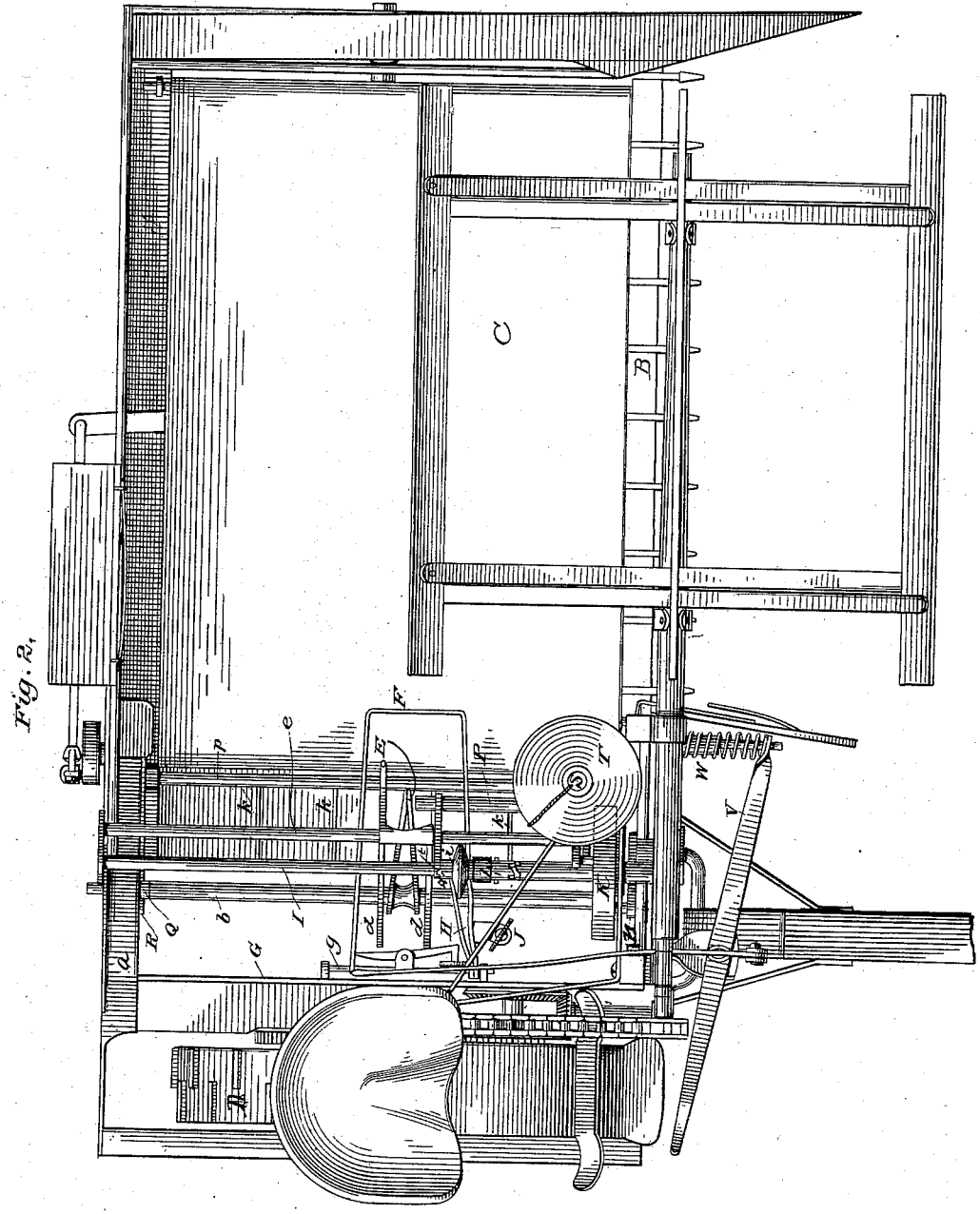
Attest:  
R. F. Barnes.  
M. V. Smith
Inventor:  
George F. Green  
By his atty

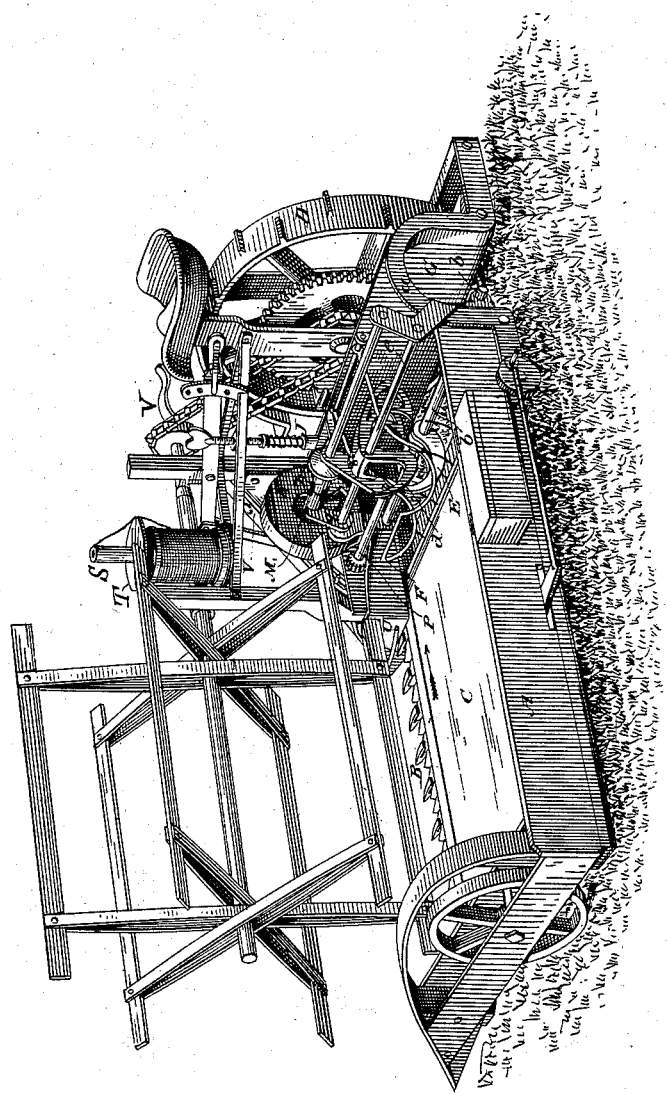

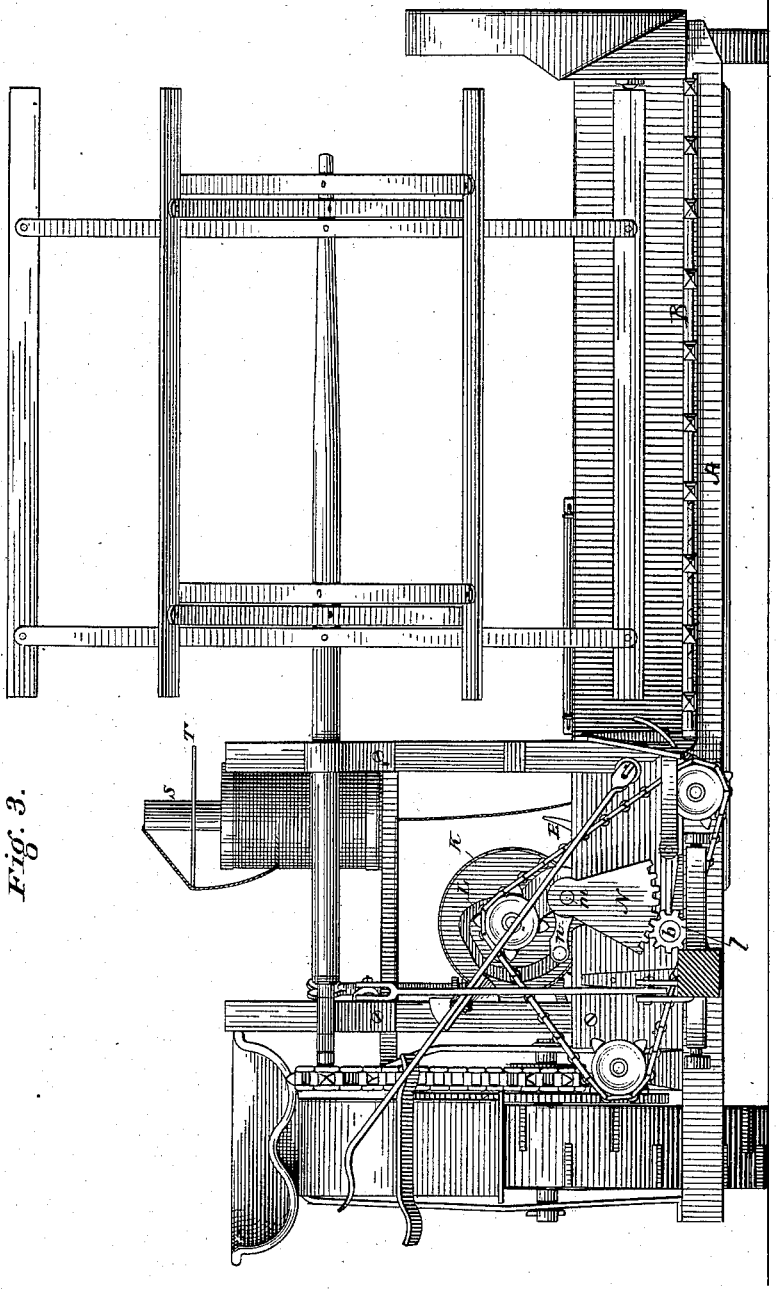

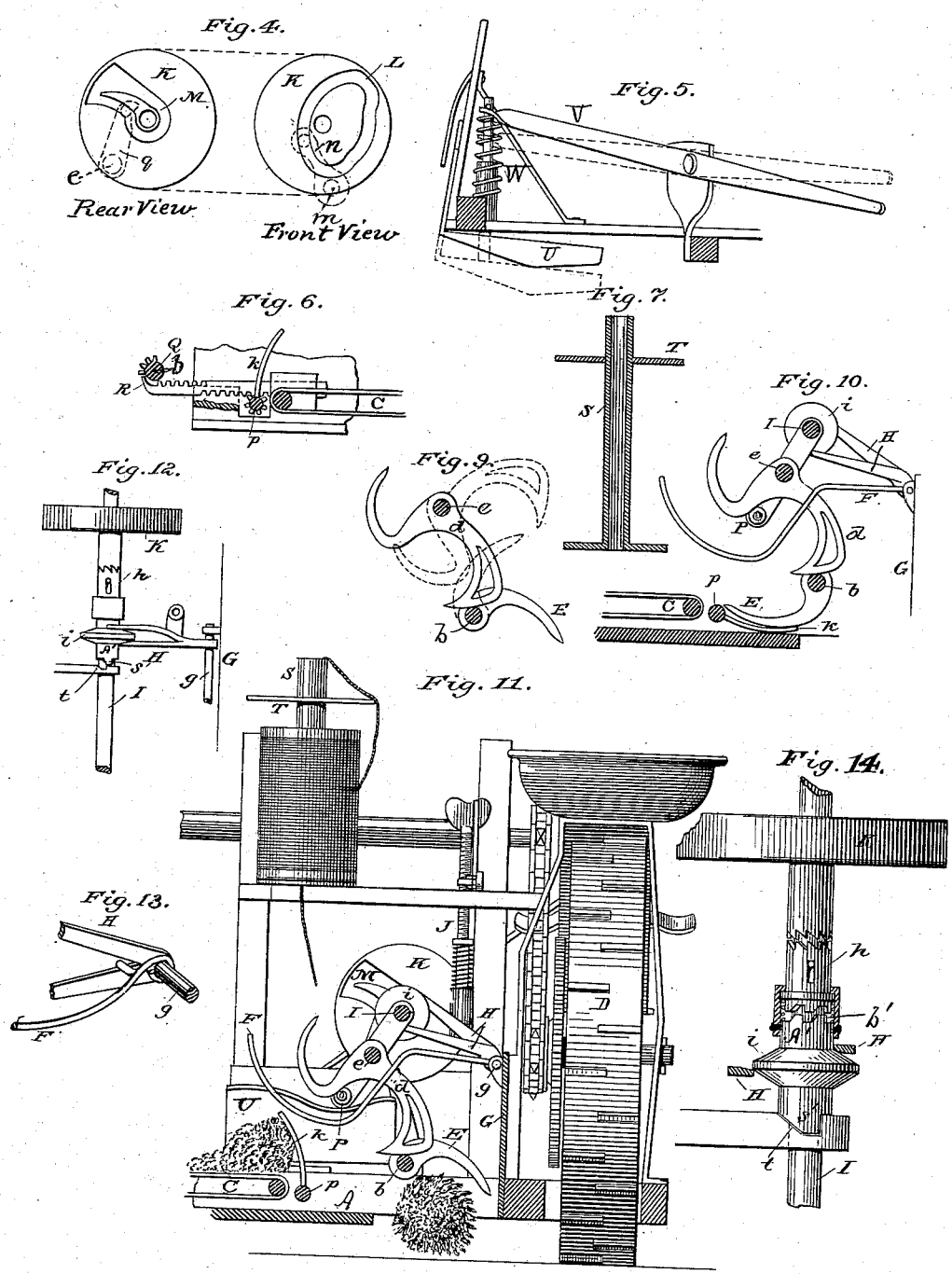

UNITED STATES PATENT OFFICE.

GEORGE F. GREEN, OF KALAMAZOO, MICHIGAN, ASSIGNOR TO WILLIAM N. WHITELEY, JEROME FASSLER, AND OLIVER S. KELLY, OF SPRINGFIELD, OHIO.

AUTOMATIC BINDER.

SPECIFICATION forming part of Letters Patent No. 265,060, dated September 26, 1882.

Application filed August 10, 1880. (No model.)

*To all whom it may concern:*

Be it known that I, GEORGE F. GREEN, of Kalamazoo, in the county of Kalamazoo and State of Michigan, have invented new and useful Improvements in Automatic Binders for Harvesting-Machines; and I do hereby declare that the following is a full and complete description of the same.

My improvements relate more particularly to that class of harvesting-machines wherein the grain is conveyed across the platform in a direction substantially parallel with the cutting apparatus, and generally by a continuously-moving belt or rake; and it consists essentially in an automatic binding apparatus placed substantially in the plane of the platform and inside the main wheel—that is to say, between the main wheel and the platform—and including the following novel features: First, the bundle is discharged by the band-carrier over its shaft to the ground through an open space between the wheel and the platform, and returns to its initial position by a backward rotary movement, and if the bundle clings to said carrier it is arrested by the compressor and torn away from the cord-carrier, and while the band-barrier is in action the incoming grain is arrested by fingers which are raised for that purpose; second, the compressor rises to permit the bundle to be discharged, and descends again behind said bundle to prevent it from returning; third, when a sufficient quantity of grain to form a bundle has been delivered into the receptacle the binding mechanism is tripped and arresting-fingers are raised to arrest the flow of grain while the cord-carrying arm is at work; fourth, the clutch-plate has conical or double inclined side faces—that is, faces which converge toward the periphery; fifth, there is also a novel spool-holder wherein the spool is stationary and covered by a disk over the edge of which the band material is drawn to a central discharge, whereby said material is drawn with uniform tension from all sides of the spool.

That others may fully understand my invention I will more particularly describe it, having reference to the accompanying drawings, wherein Figure 1 is a perspective view of my machine. Fig. 2 is a plan of the same. Fig. 3 is a front elevation. Figs. 4 to 14 are details.

A is the main frame of my harvester, and, as usual, it is a rectangular frame having the cutting apparatus B mounted on one edge, and a movable endless apron, C, moving behind and parallel with said cutting apparatus to convey the cut grain toward the main wheel D. In this machine said apron delivers the cut grain to a low-down binding apparatus located between the said main wheel and the delivery-apron C. The rear girt of the main frame is provided with an arch-piece, $a$, in rear of the binder, so that when the bound bundle is discharged upon the ground from the binder the machine may pass freely over it.

The axle of the main wheel D may be mounted in boxes, which are movable up and down by suitable means, so as to raise or lower the frame of the machine.

Power to drive the reel, cutters, and binders is taken from the main wheel by means of gearing or a chain belt in some of the usual ways. These features, being common in harvesting-machines, do not require detailed description herein.

The binding-arm or cord-carrier E is mounted upon a low-down horizontal shaft, $b$, which is not materially above the plane of the apron C, and ought not to be materially below said plane. The shaft $b$ has its bearings at its ends in suitable boxes attached to the frame A. When the band-carrier arm E is at rest its extremity or point is depressed below the roller of the endless carrier nearest the binder, so that as the straw is pressed forward it enters into the receptacle, which is immediately above and on either side of said arm or carrier. (See Fig. 10.) As the grain enters the receptacle it is passed under, and is depressed by an elastic pressure guide or arm, F, and it is prevented from passing out of the receptacle over the shaft $b$ by a swinging compressor, $d$, which is mounted upon the shaft $e$. The pressure-guide F is connected at its inner end to a rock-shaft, $g$, which moves in bearings attached to the guard-board G, which guard-board prevents the sheaf from being thrown against the wheel when it is discharged. An arm, H, is also attached to the rock-shaft $g$, and projects therefrom toward the main driving-shaft I, which receives motion from the prime mover, and transmits the same to the cam-wheel K and binding mechanism by means of a sliding clutch, *h*, which is provided with a disk, *i*, whose sides converge toward the periphery. The arm H is bifurcated, and the disk *i* is embraced between its branches. Said branches are also separated vertically, so that while the extremity of one rests against said disk on one side near its periphery the extremity of the other rests against the other side of said disk near its center. This is the initial position when the clutch *h* is disengaged. It will appear evident that if the guide F is caused to rise, and thereby rotate the rock-shaft, said arm H will be similarly raised, and the pressure upon the rear side of disk *i* by the arm H will cause the clutch *h* to move into engagement and set the binding mechanism in motion, and this effect will result from an accumulation of grain under said guide F, which will cause the guide to rise, as set forth.

If desired, the guide F may be connected to its rock-shaft with a joint, which will permit a certain degree of motion before said shaft will commence to move, as shown in Fig. 13; or the arm H may be so connected to said shaft. This will permit the clutch to be operated with a shorter motion of the shifting arm, because it will not commence to move until a quantity of grain shall have been already accumulated. It is necessary, however, that the cam-wheel K shall complete one revolution before the clutch *h* can go out of engagement. If it did not do so, the band-carrier would not be returned to its initial position. I therefore provide the clutch with a spring to move it in one direction, and with an oblique angular part, which at the proper moment will engage with another part, whereby said clutch is moved in the other direction or sustained in position when moved. By such means the proper automatic starting and stopping of the binding mechanism may be effected by a power which of itself exercises no further control until after the completion of one whole revolution it is again called into use. The mechanical arrangements of these parts may be various, but that now to be described involves the principle and appears adapted to this machine. I place behind the clutch *h* a loose sleeve, A', and the disk *i* is mounted thereon. At one end said sleeve is provided with clutch-teeth *b'* to engage with similar teeth in the clutch *h*. At the back end there is an oblique angular part—in this case in the form of a single projecting tooth, *s'*—which may at one point in the revolution drop into a corresponding cell, *t*, the sleeve being pressed in that direction by the arm H, acted upon by the spring J. This tooth may be upon either the movable or stationary part. When the disk *i* is pressed back to disengage the clutch and the tooth *s'* drops into the cell *t* the sleeve A' is drawn out of engagement with the clutch. The wheel K and the disk *i* then come to rest, and the clutch *h* continues to rotate with the shaft; but when the disk *i* is moved forward it engages the clutch-teeth *b'*, and is thereby caused to rotate. The tooth *s'* in rising out of the notch *t* forces the clutch *h* forward into engagement with the wheel K, and when so engaged it cannot retreat until at the completion of the revolution the tooth *s'* can again drop into its cell *t*. After once starting the action of the oblique surfaces *s'* and *t* upon each other causes the advance of the sleeve A' and the engagement of the clutch, so that a part of the labor of clutching may be thrown upon the motive power.

A spring, J, which is adjustable as to tension by means of a screw or other device controlled at will by the attendant, serves to automatically depress the arm H whenever the clutch is liberated and the guide F released from pressure, so that the guide F will resume its initial position and the binding mechanism will come to rest until the recurrence in the receptacle of a sufficient quantity of grain for a bundle.

The resistance of the trip which sets the binding machinery in motion may be adjusted by fixing the controlling device at any desired point in its range of motion and by a variety of well-known mechanical expedients; but I prefer to effect this control by regulating the tension of the spring J, whereby the quantity of grain to be received to constitute one bundle is determined, because the stronger the resistance of the guide F to the accumulation of grain in the receptacle the larger will be the quantity crowded therein before said guide will be raised far enough to move the clutch into engagement. The means for controlling the resistance of the guide F is convenient to the hand of the attendant, and he is therefore enabled to vary the size of the bundles being bound at will and without stopping the machinery. By pulling upward upon the screw J or its substitute the clutch may be moved into engagement and the binder started at will. I prefer, also, to employ the spring J to make the resistance of the guide F elastic, as less liable than a rigid attachment to cause disaster to the machine.

*Operation of the binding mechanism.*—The shaft I has mounted loosely upon it a disk, K, which remains at rest or is brought into motion according as it is free from or engaged with the clutch *h*. The disk K has upon each of its flat faces a cam-groove or its equivalent. One of said grooves, L, gives motion and direction to the mechanism which actuates the band-carrier E and stop-fingers *k*. The other cam, M, gives motion and control to the mechanism which actuates the shaft *e*, upon which the compressor and discharger *d* is mounted. The shaft *b*, upon which the band-carrier is mounted, has upon its forward end a pinion, *l*, in mesh with a segment-rack, N, which is caused to vibrate upon its center bearing at *m* by a laterally-projecting arm, *n*, the extremity of which rests in the cam-groove L. Said cam-groove is an irregular elliptical figure inclosing the axis of motion, one side approaching close to it, and its curves are described in such manner as to produce in the shaft $b$ the requisite movements and pauses required of the band-carrier—that is to say, when the binding mechanism goes into action the band-carrier rises and separates the gavel from the flowing stream and compresses it against the counter-compressor $d$. When the gavel has been compressed and the band presented to the band-securing mechanism said arm pauses until the band has been secured, and then the band-carrier again advances to discharge the bundle over the shaft. When this has been effected the carrier recedes to its initial position.

It will be understood that the periods of rest are produced by portions of the cam-groove concentric to the center. One revolution of the disk K completes the whole operation of binding and discharging a bundle and the return of the binding devices to their initial position.

The location of the band-securing device is shown by the cylinder P. It will receive motion by means of proper mechanism (not shown) connecting it with the shaft I. This mechanism for securing the band is not shown nor described, because it is not essential to the operation of this invention that said band-securing mechanism should be of any novel or unusual character.

At the rear end of the shaft $b$ there is a segment-pinion, Q, and a sliding toothed rack, R, which meshes with the unmutilated part of said pinion, and is thereby intermittingly reciprocated. Said rack at its other extremity meshes with a pinion on the shaft $p$, which carries the stop-fingers $k$, so that when the band-carrier begins to rise the stop-fingers are simultaneously raised and sustained in that position until the carrier E has again returned to its position.

The cam-groove M is through two-thirds of its circuit close to and concentric with the center of the wheel K, and during the remainder of its course it recedes to the periphery and returns again in paths which are nearly radial. The effect is as follows: The shaft $e$, upon which the compressor $d$ is mounted, is provided with an arm, $q$, the extremity of which is provided with a finger, which rests in said cam-groove M. The compressor $d$ requires to be held at rest until the securing of the band has been accomplished, when it is required suddenly to retreat to permit the bundle to pass and be discharged, and in this case it is required suddenly to return after the bundle has passed. By being behind the bundle it insures its detachment from the band-carrier.

The compressor $d$ consists of two arms joined to the shaft $e$. They are parallel, and may be connected at their junction with said shaft, or may be separated. They are parallel, and their extremities form plates wide in the direction of their movement, so as to present broad edges against the discharged bundle if it clings to the band-carrier on the retreat of the latter.

The front edges of the arms $d$ are curved so as to oppose to the cord-carrier a suitable concave outline for the proper reception and compression of the bundle.

Supposing cord or twine to be used for binding, the ball or spool is to be placed on the hollow spindle S, and the smooth-edged disk T is placed on said spindle above said spool or ball. The end of the band-cord is then entered at the open top of said spindle and passed down through the same to the guides, which conduct it properly to the cord-carrier. The disk T is greater in diameter than the spool or ball, and the cord, being drawn over the edge of said disk and enabled to slide freely therefrom, is taken off the spool or ball in a uniform direction away from the spool-surface, and as it unwinds the place of contact with the disk follows the point of unwinding. It is therefore impossible under any ordinary circumstances for the cord to become tangled or bound around the spindle, and the operation of the mechanism thereby impeded. As the incoming gavel is about to enter the receptacle of the binder it is desirable that the grain should be moved endwise more or less toward the back of the machine, so as to clear the butts from contact with any of the mechanism at the front of the receptacle. I therefore place the oblique guide-board U immediately behind the inner shoe, so that as the grain is carried sidewise on the apron the butts will strike the guide U, and the grain will be thereby pushed endwise toward the rear. It frequently happens that the grain is too short to be delivered in the ordinary way to the binder and have the band placed around it midway. To meet this contingency the binder has heretofore been made movable, and I have heretofore employed a movable butt-board controllable at will, so that the whole gavel can at will be moved endwise in the receptacle; but in this case the oblique guide U is mounted upon a rod connected with one end of a foot-lever, V, and provided with a retracting-spring, W, so that while at rest said guide will act in its ordinary capacity as a grain-guide for the purpose set forth, and may also be used as a butt-board, movable at will, to move short grain to the middle of the binder.

Having described my invention, what I claim as new is—

1. In an automatic binder on the plane of the apron-carrier and receiving grain directly therefrom, a band-carrying arm in and forming part of the grain-receptacle and which rises therefrom to separate and compress the bundle, combined with a set of stop-fingers, $k$, mounted upon a shaft parallel with the cord-carrier shaft and below the plane of the apron-carrier, and mechanism whereby said fingers are raised and supported while the band-carrier is in action.

2. In an automatic binder, the following instrumentalities in combination: a band-carrying arm, which also operates as a separating and compressing arm, mounted upon and moved by a shaft at the lower side of the receptacle, a counter-compressor mounted upon and moved by a shaft above the receptacle, and provided with ends widened in the direction of its movement, so that it may drop behind the discharged bundle and prevent its return, and mechanism whereby said separator and counter-compressor have imparted to them their several movements, as described.

3. The main shaft I, provided with the sliding clutch $h$ and the circular bevel-edged disk $i$, combined with the bifurcated arm H, the ends whereof are in contact with opposite sides of said disk, as set forth, and the loose cam-disk K, substantially as described.

4. In an automatic binder, the following instrumentalities in combination: a band-carrying arm, which also acts as a separating and compressing arm, which is mounted on a shaft at the lower side of the receptacle, a pivoted arm, F, above the receptacle to receive the upward thrust of the accumulated grain supported below by said receptacle, a bifurcated arm, H, connected with and controlled by said arm F, and a circular bevel-edged disk, $i$, on the clutch $h$, in engagement with said arm H, whereby the clutch mechanism is operated to start the binding mechanism by the accumulation of grain sufficient for a sheaf, in the manner set forth.

5. The pivoted arm F above the receptacle, and the bifurcated arm H, attached to said arm and in engagement with the clutch-disk $i$ to actuate the same by the upward or downward motion of said arm, combined with the spring J and means whereby the tension of said spring may be varied at will, for the purpose set forth.

6. The adjustable grain-guide U and its operating-lever V, combined with a retracting-spring, W, substantially as set forth.

7. The band-carrying arm E, which also acts as a separating and compressing arm, and its shaft $b$, and the stop-fingers $k$ on the shaft $p$, combined with a mutilated pinion, Q, on the shaft $b$, the reciprocating rack R, and the pinion on the shaft $p$, whereby the fingers $k$ receive the proper periodic motion from the shaft $b$.

8. The spool-stand provided with a hollow spindle, S, and the disk T above the spool or ball, whereby the cord may pass over the edge of said disk and down through said hollow spindle, and be fed uniformly from all sides of the spool.

GEORGE F. GREEN.

Witnesses:
   HENRY C. BRIGGS,
   WILLIAM H. DONELSON.